US011906871B2

(12) United States Patent
Huang

(10) Patent No.: US 11,906,871 B2
(45) Date of Patent: Feb. 20, 2024

(54) ELECTRONIC PAPER PACKAGE STRUCTURE

(71) Applicant: E Ink Holdings Inc., Hsinchu (TW)

(72) Inventor: Jen-Shiun Huang, Hsinchu (TW)

(73) Assignee: E INK HOLDINGS INC., Hsinchu (TW)

( * ) Notice: Subject to any disclaimer, the term of this patent is extended or adjusted under 35 U.S.C. 154(b) by 401 days.

(21) Appl. No.: 17/183,747

(22) Filed: Feb. 24, 2021

(65) Prior Publication Data

US 2021/0318586 A1  Oct. 14, 2021

(30) Foreign Application Priority Data

Apr. 13, 2020  (TW) .................................. 109112275

(51) Int. Cl.
*G02F 1/1679* (2019.01)
*G02F 1/167* (2019.01)
*G02F 1/16753* (2019.01)

(52) U.S. Cl.
CPC ............ *G02F 1/1679* (2019.01); *G02F 1/167* (2013.01); *G02F 1/16753* (2019.01)

(58) Field of Classification Search
None
See application file for complete search history.

(56) References Cited

U.S. PATENT DOCUMENTS

| 8,624,134 | B2 | 1/2014 | Chen |
| 8,908,257 | B2 | 12/2014 | Song et al. |
| 9,847,509 | B2 | 12/2017 | Chen et al. |
| 9,927,650 | B1 | 3/2018 | Almanza-Workman et al. |
| 2008/0062506 | A1 | 3/2008 | Sah |
| 2008/0174531 | A1* | 7/2008 | Sah ...................... G09G 3/2003 345/84 |
| 2015/0103393 | A1 | 4/2015 | Huang |

FOREIGN PATENT DOCUMENTS

| CN | 101154010 A | 4/2008 |
| CN | 103365022 A | 10/2013 |
| CN | 105892192 A | 8/2016 |
| CN | 106953024 A | 7/2017 |
| CN | 109616588 A | 4/2019 |
| CN | 110133923 A | 8/2019 |
| CN | 209765231 U | 12/2019 |
| TW | 201235992 A | 9/2012 |
| TW | 201339725 A | 10/2013 |

OTHER PUBLICATIONS

Taiwan Office Action of TW-109112275 dated Jul. 2, 2020.
Chinese Office Action dated Nov. 30, 2023, in the counterpart Chinese Patent Application No. 202010284471.5.

* cited by examiner

*Primary Examiner* — Dung T Nguyen
(74) *Attorney, Agent, or Firm* — Rabin & Berdo, P.C.

(57) ABSTRACT

An electronic paper package structure including a substrate, an electronic ink layer, a cover plate, at least one water vapor barrier and a sealant is provided. The electronic ink layer is disposed on the substrate. The cover plate covers the electronic ink layer, wherein the electronic ink layer is located between the substrate and the cover plate, and a groove is defined by a lower surface of the cover plate, a side surface of the electronic ink layer and an upper surface of the substrate. The at least one water vapor barrier is disposed in the groove. The sealant is filled into the groove to cover the at least one water vapor barrier.

5 Claims, 3 Drawing Sheets

ELECTRONIC PAPER PACKAGE STRUCTURE

This application claims the benefit of Taiwan application Serial No. 109112275, filed Apr. 13, 2020, the subject matter of which is incorporated herein by reference.

BACKGROUND OF THE INVENTION

Field of the Invention

The invention relates in general to an electronic element package structure, and more particularly to an electronic paper package structure.

Description of the Related Art

Along with the advance in the flat display technology, more and more electronic products, particularly, portable electronic products, such as mobile phones, e-books, and digital cameras, are equipped with a display device. As the trend of portable electronic products is directed towards light weight, small size and slimness, the display device used in the portable electronic products also needs to possess the qualities of light weight, small size and slimness.

To promote the idea of going paperless, electronic signages, such as electrophoretic displays (EPD) or electronic paper displays (EPD), can replace the conventional advertising billboards. The electronic signages not only possess the qualities of light weight and slimness but can also be equipped with flexibility.

Since the current package structure of electrophoretic displays or electronic paper displays has weaker water vapor barrier capacity in specific area or corner area, the package quality deteriorates.

SUMMARY OF THE INVENTION

The invention is directed to an electronic paper package structure capable of increasing the water vapor barrier capacity.

According to one embodiment of the present invention, an electronic paper package structure is provided. The electronic paper package structure includes a substrate, an electronic ink layer, a cover plate, at least one water vapor barrier and a sealant is provided. The electronic ink layer is disposed on the substrate. The cover plate covers the electronic ink layer, wherein the electronic ink layer is located between the substrate and the cover plate, and a groove is defined by a lower surface of the cover plate, a side surface of the electronic ink layer and an upper surface of the substrate. The at least one water vapor barrier is disposed in the groove. The sealant is filled into the groove to cover at least one water vapor barrier.

According to another embodiment of the present invention, an electronic paper package structure is provided. The electronic paper package structure includes a substrate, an electronic ink layer, a cover plate, at least one cover plate extension member and a sealant. The electronic ink layer is disposed on the substrate. The cover plate covers the electronic ink layer, wherein the electronic ink layer is located between the substrate and the cover plate, and a groove is defined by a lower surface of the cover plate, a side surface of the electronic ink layer and an upper surface of the substrate. The at least one cover plate extension member is disposed on an outer side of the cover plate to extend the size of the groove. The sealant is filled into the groove.

According to an alternate embodiment of the present invention, an electronic paper package structure is provided. The electronic paper package structure includes a substrate, an electronic ink layer, a cover plate, a sealant and at least one water vapor barrier film. The electronic ink layer is disposed on the substrate. The cover plate covers the electronic ink layer, wherein the electronic ink layer is located between the substrate and the cover plate, and a groove is defined by a lower surface of the cover plate, a side surface of the electronic ink layer and an upper surface of the substrate. The sealant is filled into the groove. The at least one water vapor barrier film covers the sealant.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements. Directional terms such as above, under, left, right, front or back are used in the following embodiments to indicate the directions of the accompanying drawings, not for limiting the present invention.

According to an embodiment of the present invention, an electronic paper package structure is provided. The electronic paper package structure is configured to increase the water vapor barrier capacity. Particularly at a specific area or corner area where the water vapor barrier capacity is weaker, water vapor barrier, such as water vapor barrier block, cover plate extension member and/or water vapor barrier film, can be configured to increase the water vapor barrier capacity of the electronic paper package structure or extend the water vapor barrier distance, such that the package quality can be increased. In an embodiment, the water vapor barrier capacity is represented by water vapor transmission rate (WVTR). Under the condition that the temperature is 60° C. and the moisture is 90%, the water vapor transmission rate preferably is smaller than a value between 2-5 $g/m^2/day$, smaller than 1 $g/m^2/day$, smaller than 0.5 $g/m^2/day$, smaller than 0.1 $g/m^2/day$, or even smaller than 0.01 $g/m^2/day$.

First Embodiment

Figure 1A:
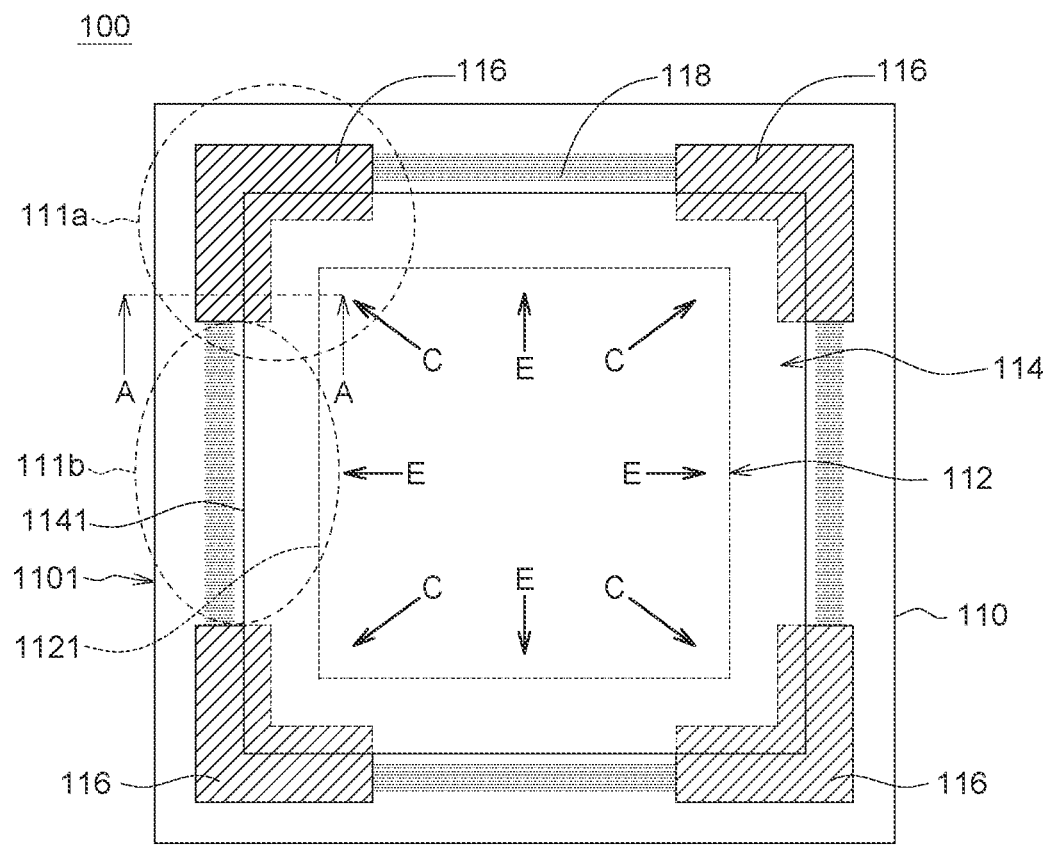
FIGS. 1A and 1B respectively are a top view of an electronic paper package structure and a partial cross-sectional view along a cross-sectional line A-A according to an embodiment of the present invention.
Figure 1B:
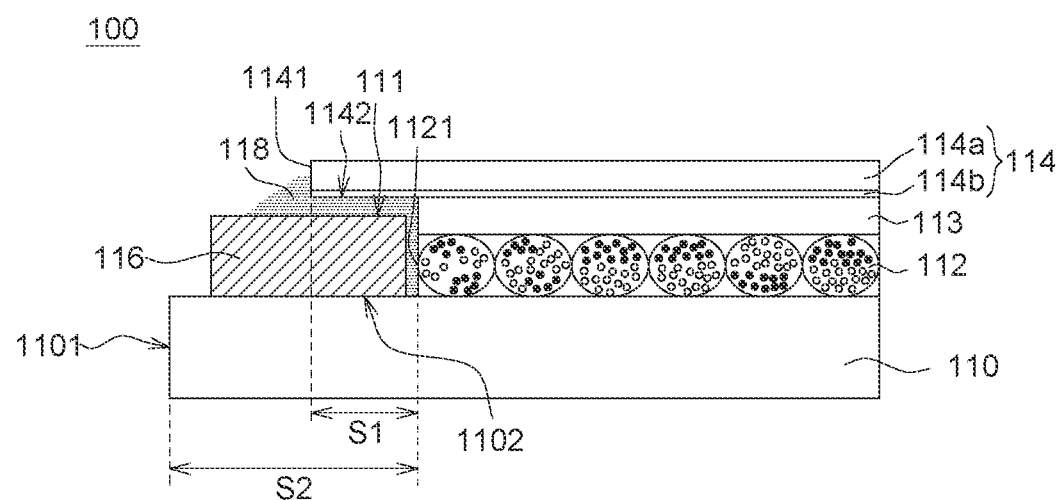

FIGS. 1A and 1B respectively are a top view of an electronic paper package structure 100 and a partial cross-sectional view along a cross-sectional line A-A according to an embodiment of the present invention. As indicated in FIGS. 1A and 1B, the electronic paper package structure 100 includes a substrate 110, an electronic ink layer 112, a cover plate 114, at least one water vapor barrier (block) 116 and a sealant 118.

The substrate 110, for example, can be a transparent glass, a plastic substrate or a non-transparent substrate. A thin-film transistor array (TFT array) is disposed on the upper surface 1102 of the substrate 110 and configured as a lower electrode plate. The cover plate 114 may include a transparent sheet 114a and a translucent water vapor barrier 114b. The transparent sheet 114a can be formed of glass or plastics such as polyethylene terephthalate (PET), polystyrene (PS) or polycarbonate (PC). The translucent water vapor barrier 114b can be formed of at least one of alumina (AlOx), silica, silicon nitride, titanium oxide, zirconium oxide, aluminum oxynitride, silicon oxynitride and amorphous carbon. The water vapor barrier capacity of the translucent water vapor barrier 114b is greater than that of the transparent sheet 114a. Moreover, a transparent electrode layer 113 formed of such as indium tin oxide (ITO) is disposed on the lower surface 1142 of the cover plate 114 and configured as an upper electrode plate.

The electronic ink layer 112 is disposed on the substrate 110 and located between the substrate 110 and the cover plate 114. The electronic ink layer 112 may include millions of microcapsules, each having electrophoretic particles, wherein the electrophoretic particles include white particles carrying positive charges and black particles carrying negative charges and are suspended in a transparent liquid. When the electrical field between the substrate 110 and the cover plate 114 is conducted, the electrophoretic particles are moved to the top of the microcapsules due to the attraction between positive and negative charges, such that white or black particles at corresponding blocks will be viewable to the viewers and show a pixel pattern. Additionally, the electronic ink layer 112 can be a tri-color or multi-color electronic ink layer such that a full color gamut display can be achieved. However, the present invention does not have specific restrictions regarding the said arrangement.

In an embodiment as indicated in FIG. 1B, a groove 111 is defined by a lower surface 1142 of the cover plate 114, a side surface 1121 of the electronic ink layer 112 and an upper surface 1102 of the substrate 110 and configured to receive at least one water vapor barrier 116, and the sealant 118 is filled into the groove 111 to cover the water vapor barrier 116. In the present embodiment, the quantity of the water vapor barrier 116 can be one or more than one and can be adjusted according to actual conditions. In an embodiment, a part of the upper surface and a part of the side surface of the water vapor barrier 116 can be exposed outside the cover plate 114; or only the side surface of the water vapor barrier 116 is exposed outside the cover plate 114 but the rest of the water vapor barrier 116 is covered by the sealant 118; or the water vapor barrier 116 is not exposed outside the cover plate 114 and is completely covered by the sealant 118.

Besides, the lower surface 1142 of the cover plate 114 and the upper surface 1102 of the substrate 110 are opposite to each other, the side surface 1121 of the electronic ink layer 112 is separated from the side surface 1141 of the cover plate 114 by a first size S1 (that is, the depth of the groove 111), and the side surface 1121 of the electronic ink layer 112 is separated from the side surface 1101 of the substrate 110 by a second size S2 (that is, the width of the non-display area), wherein the first size S1 is smaller than the second size S2, the size of the water vapor barrier 116 is between the first size S1 and the second size S2 or is smaller than the first size S1, and the electronic ink layer 112 is interposed between the substrate 110 and the cover plate 114 to increase the water vapor barrier distance and avoid external water vapor infiltrating the electronic ink layer 112.

In an embodiment, the water vapor barrier 116 can surround the peripheral area of the electronic ink layer 112 completely or segmentally, that is, the water vapor barrier 116 can reinforce a specific area or corner area of the electronic ink layer 112 to increase or extend the water vapor barrier capacity of the electronic paper package structure 100.

Illustratively but not restrictively, the water vapor barrier capacity of the water vapor barrier 116 can be greater than or smaller than the water vapor barrier capacity of the sealant 118. The sealant 118 can be a thermoplastic, a thermosetting, a UV curing or a room-temperature curing polymer hardened glue, and the present invention is not limited thereto. When the sealant 118 is a liquid viscous, the sealant 118 can be filled into the groove 111, the gap between the water vapor barrier 116 and the cover plate 114 and the gap between the water vapor barrier 116 and the electronic ink layer 112. After the sealant 118 is solidified, external water vapor cannot infiltrate into the electronic paper package structure via the above gaps.

In an embodiment, the material of the water vapor barrier film 116 includes a polymer, such as epoxy resin and polyurethane (PU), metal or ceramics. Under the condition that the temperature is 60° C. and the moisture is 90%, the water vapor transmission rate of the water vapor barrier 116 can be smaller than 2-5 $g/m^2$/day, smaller than 1 $g/m^2$/day, smaller than 0.5 $g/m^2$/day, smaller than 0.1 $g/m^2$/day, or even smaller than 0.01 $g/m^2$/day to meet the requirement of high water vapor barrier capacity.

In an embodiment as indicated in FIG. 1A, the groove 111 includes a first area 111a and a second area 111b, wherein the first area 111a is an L-shaped area or an arced corner area (that is, 4 corner areas), and the second area 111b is a stripped area (that is, the short side area or the long side area). The water vapor barrier 116 is disposed in the first area 111a of the groove 111 and has an L-shape corresponding to the shape of to the first area 111a. The first area 111a corresponds to a corner C of the electronic ink layer 112, and the second area 111b corresponds to an edge E of the electronic ink layer 112. That is, in comparison to the edge E of the electronic ink layer 112, water vapor can more easily infiltrate the electronic ink layer 112 via the corner C. Therefore, with the water vapor barrier 116 being added to the corner C of the electronic ink layer 112, the sealant 118 can provide higher water vapor barrier capacity to the corner C of the electronic ink layer 112.

Second Embodiment

Figure 2A:
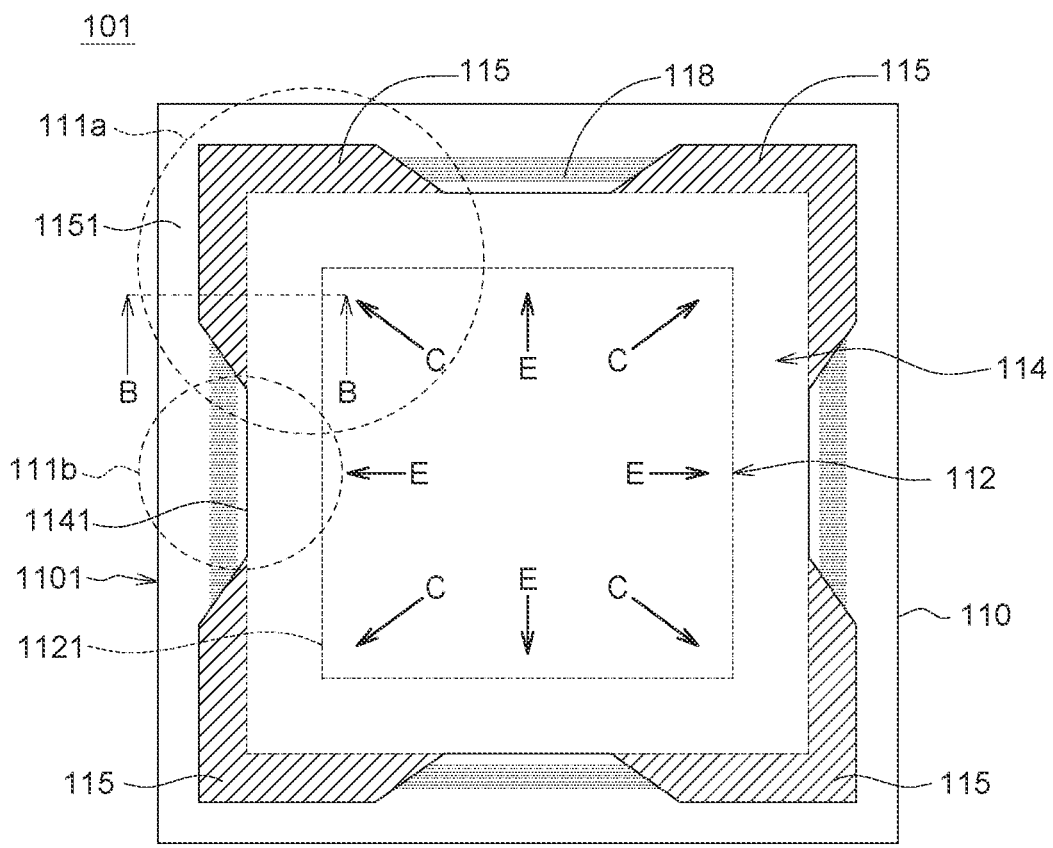
FIGS. 2A and 2B respectively are a top view of an electronic paper package structure and a partial cross-sectional view along a cross-sectional line B-B according to an embodiment of the present invention.
Figure 2B:
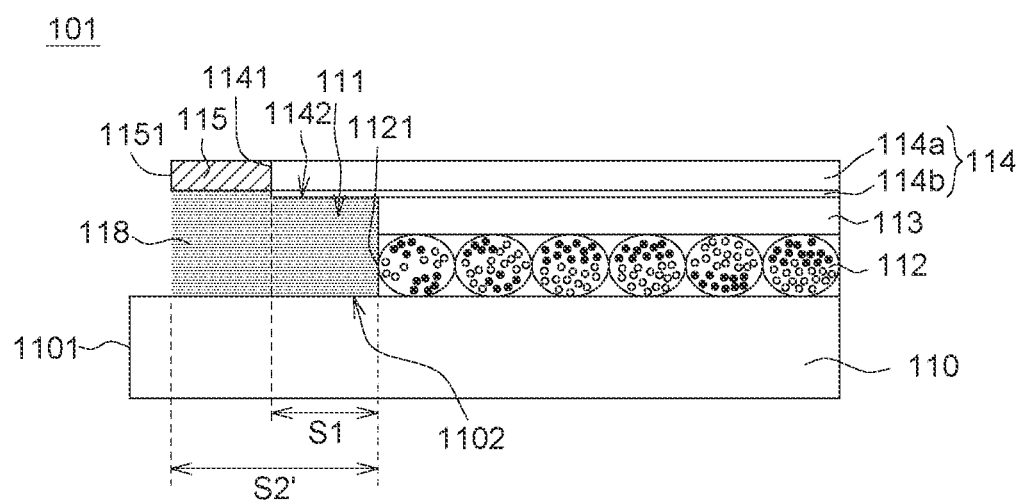

FIGS. 2A and 2B respectively are a top view of an electronic paper package structure 101 and a partial cross-sectional view along a cross-sectional line B-B according to an embodiment of the present invention. As indicated in FIGS. 2A and 2B, the electronic paper package structure 101 includes a substrate 110, an electronic ink layer 112, a cover plate 114, at least one cover plate extension member 115 and a sealant 118. In the present embodiment, a groove 111 is defined by a lower surface 1142 of the cover plate 114, a side surface 1121 of the electronic ink layer 112 and an upper surface 1102 of the substrate 110, and the sealant 118 is filled into the groove 111. Detailed descriptions of the substrate 110, the electronic ink layer 112, the cover plate 114 and the sealant 118 are already disclosed in the first embodiment and are not repeated here. The present embodiment is different from the first embodiment in that the water vapor barrier 116 of the first embodiment is replaced by the cover plate extension member 115.

The cover plate extension member 115 is disposed on an outer side of the cover plate 114 to extend the size of the groove 111, such that the amount of the sealant 118 filled into the groove 111 can be increased and the water vapor barrier distance of the sealant 118 can be extended. That is, as the water vapor barrier distance of the sealant 118 increases, water vapor can hardly enter the electronic paper package structure 101.

In an embodiment, the cover plate extension member 115 and the cover plate 114 can be integrally formed in one piece; or the cover plate extension member 115 is fixed on the outer side of the cover plate 114 using other methods such as attaching method.

As indicated in FIG. 2B, the side surface 1121 of the electronic ink layer 112 is separated from the side surface 1141 of the cover plate 114 by a first size S1 (that is, the original depth of the groove 111), and the side surface 1121 of the electronic ink layer 112 is separated from the side surface 1151 of the cover plate extension member 115 by a second size S2' (that is, the extended depth of the groove 111), wherein the second size S2' is greater than the first size S1, the second size S2' is slightly shorter than or equivalent to the second size S2 of the first embodiment (that is, the width of the non-display area), that is, the cover plate extension member 115 can extend the water vapor barrier distance of the sealant 118 to avoid external water vapor infiltrating the electronic ink layer 112.

In an embodiment as indicated in FIG. 2A, the groove 111 includes a first area 111a and a second area 111b, wherein the first area 111a is an L-shaped area or an arced corner area (that is, 4 corner areas), and the second area 111b is a stripped area (that is, the short side area or the long side area). The cover plate extension member 115 is located in the first area 111a of the groove 111 and has an L-shape corresponding to the shape of to the first area 111a. The first area 111a corresponds to a corner C of the electronic ink layer 112, and the second area 111b corresponds to an edge E of the electronic ink layer 112. That is, in comparison to the edge E of the electronic ink layer 112, water vapor can more easily infiltrate the electronic ink layer 112 via the corner C. Therefore, with the cover plate extension member 115 being added to the corner C of the electronic ink layer 112, the sealant 118 can provide higher water vapor barrier capacity to the corner C of the electronic ink layer 112.

Third Embodiment

Figure 3A:
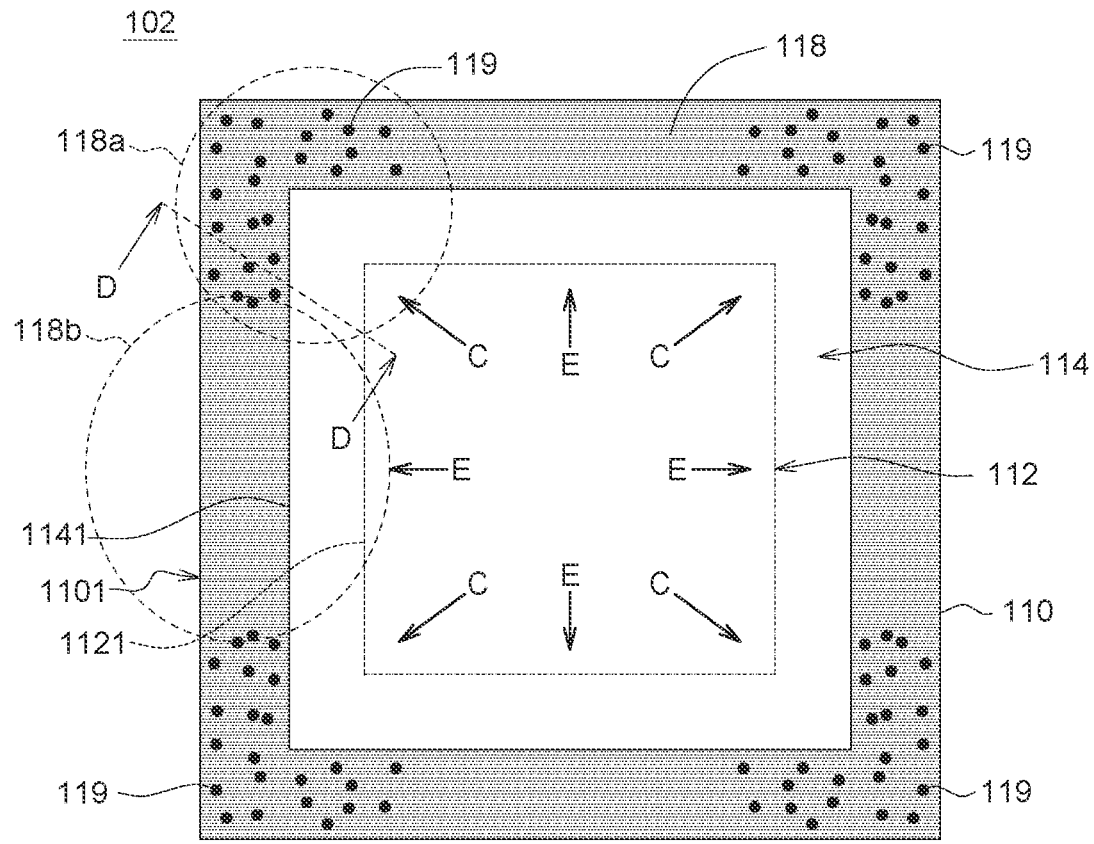
FIGS. 3A and 3B respectively are a top view of an electronic paper package structure and a partial cross-sectional view along a cross-sectional line D-D according to an embodiment of the present invention.
Figure 3B:
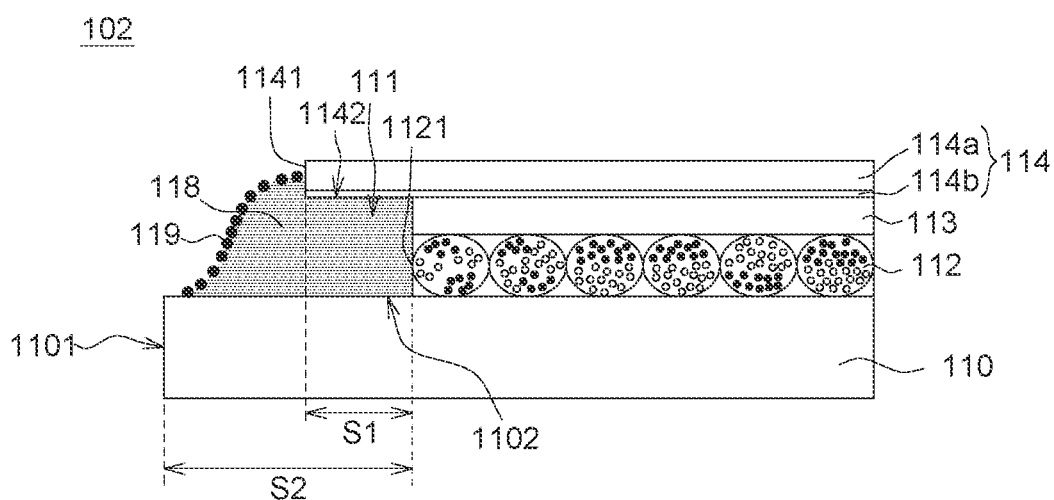

FIGS. 3A and 3B respectively are a top view of an electronic paper package structure 102 and a partial cross-sectional view along a cross-sectional line D-D according to an embodiment of the present invention. Referring to FIGS. 3A and 3B, the electronic paper package structure 102 includes a substrate 110, an electronic ink layer 112, a cover plate 114, a sealant 118 and at least one water vapor barrier film 119. In the present embodiment, a groove 111 is defined by a lower surface 1142 of the cover plate 114, a side surface 1121 of the electronic ink layer 112 and an upper surface 1102 of the substrate 110, and the sealant 118 is filled into the groove 111. Besides, the water vapor barrier film 119 is configured to seal the sealant 118. Detailed descriptions of the substrate 110, the electronic ink layer 112, the cover plate 114 and the sealant 118 are already disclosed in the first embodiment and are not repeated here. The present embodiment is different from the first and second embodiments in that the cover plate extension member 115 and the water vapor barrier 116 of the two embodiments are replaced by the water vapor barrier film 119.

In an embodiment, the material of the water vapor barrier film 119 includes a polymer, such as epoxy resin or polyurethane (PU), a metal oxide, a ceramic power, a ceramic coating, or at least one material selected from alumina (AlOx), silica, silicon nitride, titanium oxide, zirconium oxide, aluminum oxynitride, silicon oxynitride and amorphous carbon. The water vapor barrier film 119 is sprayed on an outer surface of the sealant 118 to increase the water vapor barrier capacity of the sealant 118. In the present embodiment, the quantity of the water vapor barrier film 119 can be one or more than one and can be adjusted according to actual conditions. The water vapor barrier film 119 can cover the outer surface of the sealant 118 completely or partially, and the present invention does not have specific restrictions regarding the said arrangement.

Besides, the lower surface 1142 of the cover plate 114 and the upper surface 1102 of the substrate 110 are opposite to each other, the side surface 1121 of the electronic ink layer 112 is separated from the side surface 1141 of the cover plate 114 by a first size S1 (that is, the depth of the groove 111), and the side surface 1121 of the electronic ink layer 112 is separated from the side surface 1101 of the substrate 110 by a second size S2 (that is, the width of the non-display area), wherein the first size S1 is smaller than the second size S2, the water vapor barrier film 119 is distributed over an area between the first size S1 and the second size S2, and the electronic ink layer 112 is hidden between the substrate 110 and the cover plate 114 to increase the water vapor barrier distance and avoid external water vapor infiltrating the electronic ink layer 112.

In an embodiment, the water vapor barrier film 119 can surround the electronic ink layer 112 (or the cover plate 114) completely or segmentally, that is, the water vapor barrier film 119 can reinforce a specific area or corner area of the electronic ink layer 112 to increase the water vapor barrier capacity of the electronic paper package structure 102.

Besides, the water vapor barrier capacity of the water vapor barrier film 119 can be greater than that of the sealant 118. Under the condition that the temperature is 60° C. and the moisture is 90%, the water vapor transmission rate of the water vapor barrier film 119 can be smaller than 1 g/m²/day, smaller than 0.5 g/m²/day, smaller than 0.1 g/m²/day, or even smaller than 0.01 g/m²/day to meet the requirement of high water vapor barrier capacity.

In an embodiment as indicated in FIG. 3A, the sealant 118 includes a first area 118a and a second area 118b, wherein the first area 118a is an L-shaped area or an arced corner area (that is, 4 corner areas), and the second area 111b is a stripped area (that is, the short side or the long side area). The water vapor barrier film 119 covers the first area 118a of the sealant 118 and has an L-shape or an arced corner corresponding to the shape of the first area 118a. The first area 118a corresponds to a corner C of the electronic ink layer 112, and the second area 118b corresponds to an edge E of the electronic ink layer 112. That is, in comparison to the edge E of the electronic ink layer 112, water vapor can more easily infiltrate the electronic ink layer 112 via the corner C. Therefore, with the water vapor barrier film 119 being added to the corner C of the electronic ink layer 112, the sealant 118 can provide higher water vapor barrier capacity to the corner C of the electronic ink layer 112.

As disclosed in above embodiments of the present invention, through the use of a high water vapor barrier, such as a water vapor barrier block, a cover plate extension member and/or a water vapor barrier film, the electronic paper package structure can increase the water vapor barrier capacity or extend the water vapor barrier distance to increase the package quality. The first embodiment, the second embodiment and the third embodiment disclosed above can be implemented separately or can be combined. For example, the first embodiment and the second embodiment can be combined, such that the water vapor barrier capacity can be increased through the use of a water vapor barrier block and the water vapor barrier distance can be extended through the use of a cover plate extension member. The second embodiment and the third embodiment can be combined, such that the water vapor barrier distance can be extended through the use of a cover plate extension member, and the water vapor barrier capacity can be increased through the use of a water vapor barrier film. The first embodiment, the second embodiment and the third embodiment can be combined, such that the water vapor barrier capacity can be increased through the use of a water vapor barrier block and a water vapor barrier film, and the water vapor barrier distance can be extended through the use of a cover plate extension member.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic paper package structure, comprising:
  a substrate;
  an electronic ink layer having four corners, disposed on the substrate;
  a cover plate configured to cover the electronic ink layer, wherein the electronic ink layer is located between the substrate and the cover plate, and a groove is defined by a lower surface of the cover plate, a side surface of the electronic ink layer and an upper surface of the substrate;
  a plurality of water vapor barriers disposed in the groove and protruding from a side surface of the cover plate; and
  a sealant that fills the groove to cover the water vapor barriers, wherein the groove comprises a first area and a second area, and the water vapor barriers are only disposed in the first area of the groove, the first area corresponding to the four corners of the electronic ink layer.

2. The electronic paper package structure according to claim 1, wherein a water vapor barrier capacity of each of the water vapor barriers is greater than a water vapor barrier capacity of the sealant.

3. The electronic paper package structure according to claim 1, wherein a material of each of the water vapor barriers comprises polymer, metal or ceramics.

4. The electronic paper package structure according to claim 1, wherein the side surface of the electronic ink layer is separated from the side surface of the cover plate by a first size, the side surface of the electronic ink layer is separated from a side surface of the substrate by a second size, the first size is smaller than the second size, and a size of the water vapor barrier is between the first size and the second size or is smaller than the first size.

5. The electronic paper package structure according to claim 1, wherein the second area corresponds to an edge of the electronic ink layer.

* * * * *